United States Patent
Kawakami (10) Patent No.: US 6,643,786 B1
(45) Date of Patent: Nov. 4, 2003

(54) COMPUTER BATTERY EVENT MANAGING METHOD WITH OPTION TO COMPULSORILY EXECUTE A LOW BATTERY CAPACITY OPERATION EVEN WHEN A PROGRAM OF THE COMPUTER DOES NOT RESPOND

(75) Inventor: Tomoyuki Kawakami, Fussa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/490,041

(22) Filed: Jan. 24, 2000

(30) Foreign Application Priority Data

Jan. 25, 1999 (JP) .......................................... 11-016023

(51) Int. Cl.[7] ................................................ G06F 1/30
(52) U.S. Cl. ...................... 713/340; 320/136; 340/636; 714/39
(58) Field of Search .......................... 340/636; 320/128, 320/135, 136; 713/340; 714/39

(56) References Cited

U.S. PATENT DOCUMENTS

| | | | |
|---|---|---|---|
| 5,459,671 A | * 10/1995 | Duley | 320/DIG. 21 |
| 5,600,230 A | * 2/1997 | Dunstan | 340/636 |
| 5,678,050 A | 10/1997 | Kudoh | |
| 5,710,931 A | 1/1998 | Nakamura et al. | |
| 5,721,482 A | 2/1998 | Benvegar et al. | |
| 5,870,685 A | * 2/1999 | Flynn | 320/128 |
| 6,405,327 B1 | * 6/2002 | Sipple et al. | 714/39 |
| 6,571,343 B1 | * 5/2003 | Johnson et al. | 713/340 |

FOREIGN PATENT DOCUMENTS

JP          8-221160          8/1996

OTHER PUBLICATIONS

"Power Management in Windows 98", Twinhead Corporation Online Help, last modified Jul. 23, 1998.*
Smart Battery Data Specification, Revision 1.0A, Feb. 15, 1995.*
Advanced Configuration and Power Interface Specification, Revision 1.0, Dec. 22, 1996, Section 3.8: Battery Management.*

* cited by examiner

Primary Examiner—Thomas Lee
Assistant Examiner—Albert Wang
(74) Attorney, Agent, or Firm—Finnegan, Henderson, Farabow, Garrett & Dunner, L.L.P.

(57) ABSTRACT

A battery event information setting controller causes a battery event information setting screen, receives battery event information made up of remaining battery capacity points and corresponding battery events, and sets the battery event information in a setting table. A remaining battery capacity monitor monitors a change in the remaining battery capacity and, when sensing a change, supplies the remaining battery capacity to an operation executing section. The operation executing section reads the battery event information and causes a display controller or a sound controller to execute the battery event indicated by the read-out battery event information, starts a specific application program, or causes the computer to carry out a specific operation.

15 Claims, 6 Drawing Sheets

COMPUTER BATTERY EVENT MANAGING METHOD WITH OPTION TO COMPULSORILY EXECUTE A LOW BATTERY CAPACITY OPERATION EVEN WHEN A PROGRAM OF THE COMPUTER DOES NOT RESPOND

BACKGROUND OF THE INVENTION

The present invention relates to a battery-powered computer and a battery event managing method in the computer.

This application is based on Japanese Patent Application No. 11-016023, filed Jan. 25, 1999, the entire content of which is incorporated herein by reference.

Various types of battery-powered personal computers have been developed for use at the place where the user is staying or for use in a car or train by which the user is moving from one place to another. Moreover, many of the desktop personal computers, not intended for portable use, can be powered by the battery so as to continue executing the process for some time, in case the externally supplied power goes off because of, for example, power failure.

This type of battery-powered personal computer is provided with various electric power saving functions to make the continuous running time in the battery-powered mode as long as possible. For example, one of the power saving functions is to turn off the display section, such as the LCD, when there is no input from the keyboard for longer than a specific period of time. For battery-powered operations, it is desirable that, besides the electric power saving function, there should be provided the function of checking for the remaining battery capacity and automatically executing the process (e.g., warning) the user wants according to the remaining charge capacity.

In the prior art, however, the charging and discharging of the battery was controlled by just monitoring the fully charged state and the low battery state. The remaining battery capacity was not checked minutely. For automatic processing according to the remaining battery capacity, a fixed process (e.g., warning sound generation) predetermined in the system was executed. The user was unable to set a suitable automatic process. That is, only a fixed process was executed depending on the remaining battery capacity, such as small remaining battery capacity.

As described above, with the conventional battery-powered computer and battery event managing method, it was impossible for the user to choose more than one remaining battery capacity freely and execute the desired processes when the remaining battery capacity reached the respective remaining battery capacities chosen.

BRIEF SUMMARY OF THE INVENTION

It is, accordingly, an object of the present invention to overcome the above-described disadvantages by providing a battery-powered computer which allows the user to specify the remaining battery capacity and a desired operation arbitrarily and can execute the specified operation automatically when the remaining battery capacity has reached to the specified remaining battery capacity.

It is another object of the present invention to provide a battery event managing method in the above battery-powered computer.

According to the present invention, there is provided a computer comprising event setting means for setting a remaining battery capacity point and an event which are specified by a user and relate to each other, and event generating means for generating the event set by the event setting means in relation to the battery remaining capacity point, when a remaining battery capacity has reached the remaining battery capacity point specified by the user.

According to the present invention, there is provided an event managing method in a computer, comprising a setting step for setting a remaining battery capacity point and an event which are specified by a user and relate to each other, and a generating step for generating the event set in relation to the remaining battery capacity point, when the remaining battery capacity has reached the remaining battery capacity point specified by the user.

The present invention enables a user-desired event to be generated at a remaining battery capacity point (or points) the user has specified arbitrarily. This helps meet the user's requirements concerning system operation flexibly. The event includes, for example, the reproduction of the audio data stored in the specified audio file, the message display of the text file stored in a specified text file, and the startup of the application program stored in a specified program file.

Furthermore, the present invention enables an event to be generated in such a manner that an event generated when the remaining battery capacity point has been reached as a result of charging differs from an event generated when the remaining battery capacity point has been reached as a result of discharging. This makes it possible to fulfill the user's requirements concerning system operation more precisely.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

A preferred embodiment of a battery-powered personal computer according to the present invention will now be described with reference to the accompanying drawings.

First Embodiment

Figure 1:
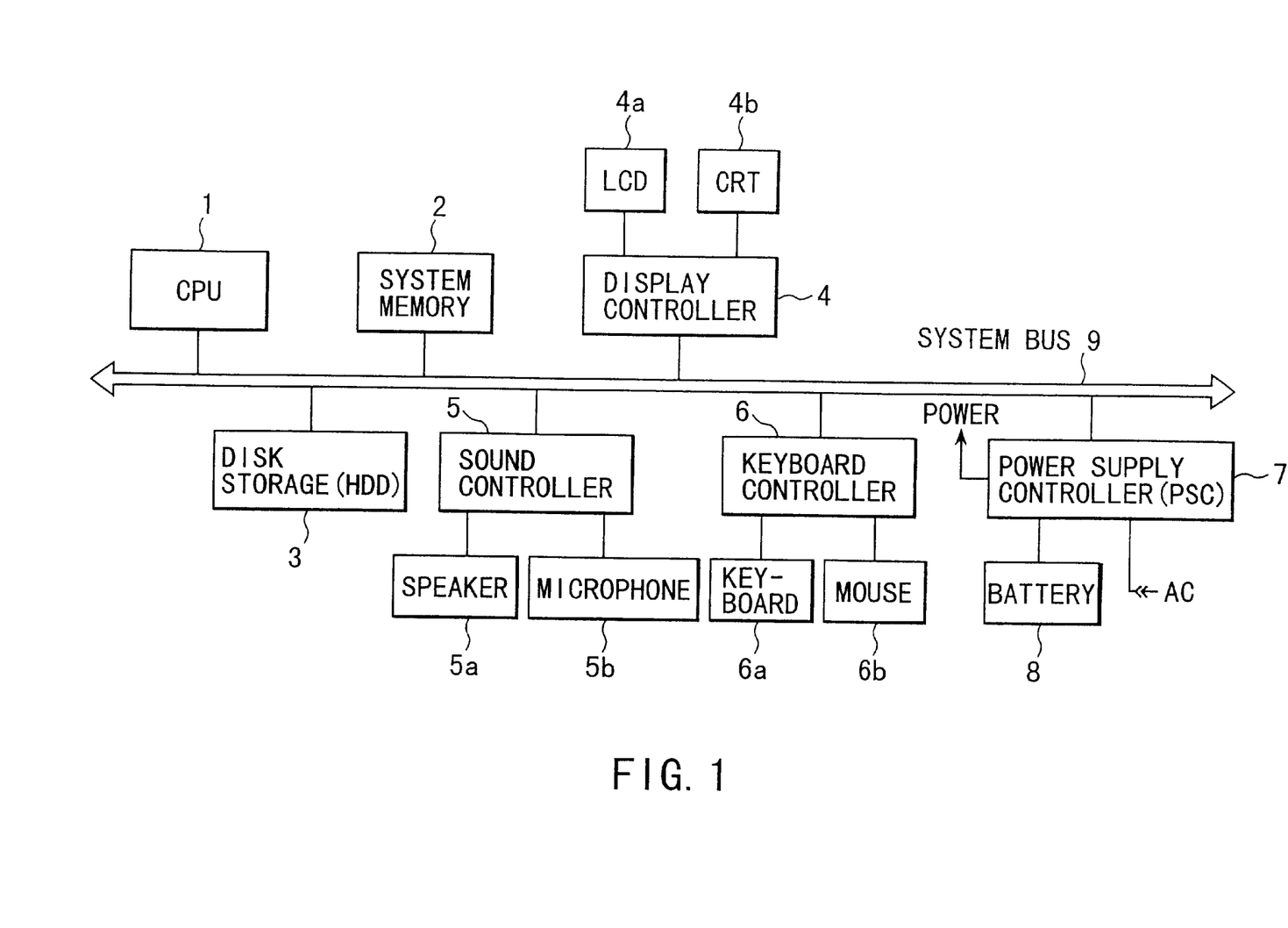
FIG. 1 is a block diagram of a personal computer according to an embodiment of the present invention.

FIG. 1 shows the configuration of a personal computer according to an embodiment of the present invention. The personal computer that can be powered by a battery is of the notebook type, for example. The personal computer comprises a CPU 1 connected to a system bus 9, a system memory 2, a disk storage unit (HDD) 3, a display controller 4, a sound controller 5, a keyboard controller 6, and a power supply controller (PSC) 7. LCD 4a and CRT 4b are connected to the display controller 4. A speaker 5a and a microphone 5b are connected to the sound controller 6. A keyboard 6a and a mouse 6b are connected to the keyboard controller 6. A battery 8 and an external power supply (AC) are connected to the power supply controller 7.

The CPU 1, which controls the whole of the computer, executes an operating system, BIOS, and various application programs, including utility programs, such as device drivers stored in the system memory 2.

The system memory 2 is a memory device serving as the main memory of the computer. In the system memory 2, the operating system executed by the CPU 1, BIOS and various application programs, and various data items used for those executions are stored.

The disk storage unit (HDD) 3 is a memory device serving as an external memory for the computer. In the disk storage unit 3, the various programs and data items loaded into the system memory 2 and various data items outputted from the system memory 2 are stored. Furthermore, various programs swapped out from the system memory 2 are stored temporarily in the disk storage unit 3.

The display controller 4, which is a device that supervises the user interface output in the computer, displays the display data given by the CPU 1 on the LCD 4a and CRT 4b.

The sound controller 5 reproduces audio data by decoding the encoded audio data and supplying the decoded data to the speaker 5a or encodes the sound inputted via the microphone 5b into audio data and supplies the audio data to the computer.

The keyboard controller 6, which is a device that supervises the input of the user interface of the computer, hands over the control data inputted from the keyboard 6a or mouse 6b to the CPU 1 via the register provided in the controller 6.

The power supply controller 7, which controls the overall power supply of the computer, effects the switching between the power supply and cutoff of the external power supply (AC) and battery 8 or the charging of the battery 8.

The battery 8 is a power supply that supplies electric power required for the computer to operate when the external power supply is not available, for example, when the user is carrying the computer with him or her. The battery 8 is composed of a secondary battery capable of charging and discharging repeatedly.

Figure 2:
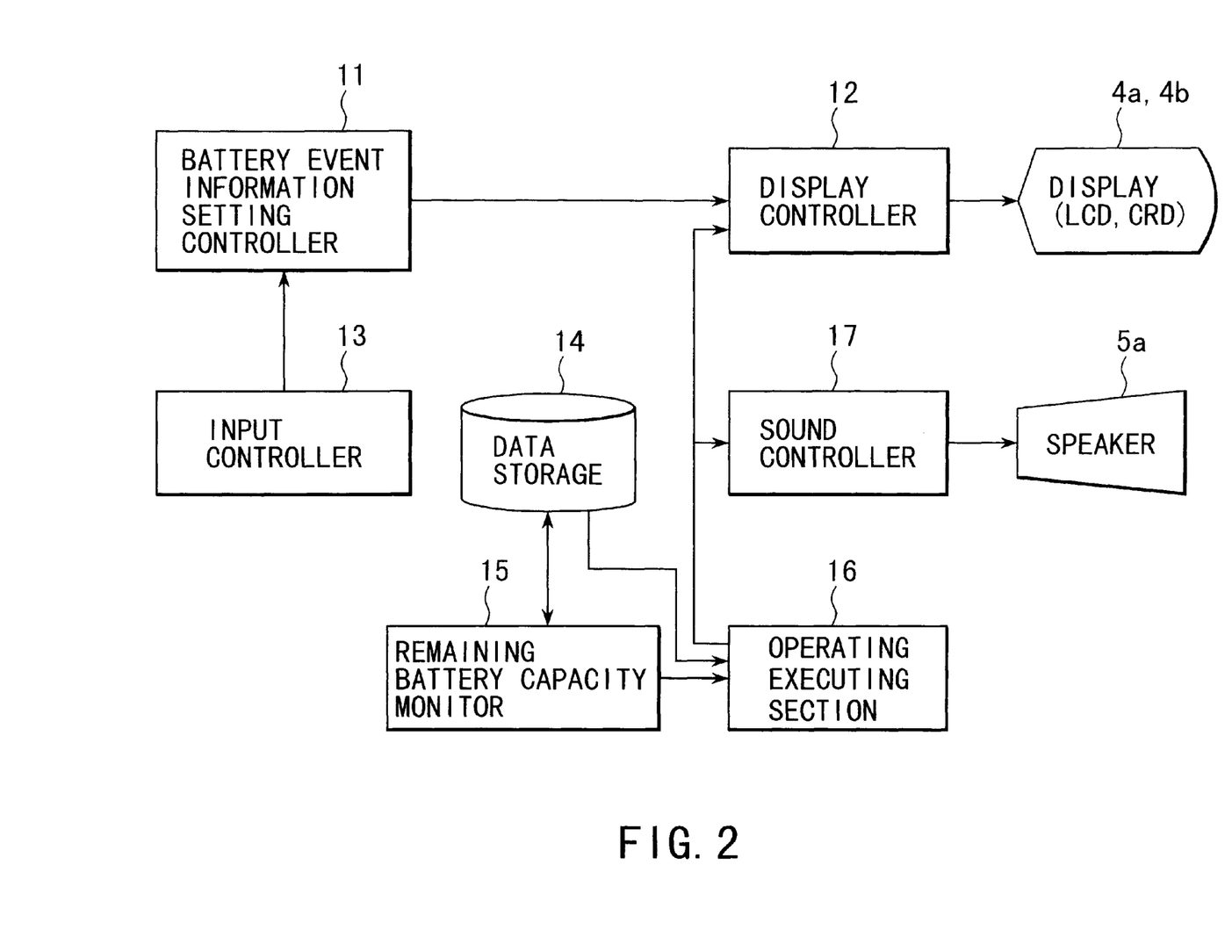
FIG. 2 is a functional block diagram showing the battery event management of the computer of FIG. 1.

FIG. 2 is a functional block diagram related to the battery event management in the personal computer constructed as described above.

As shown in FIG. 2, the battery event management in the personal computer is composed of the following functional blocks: a battery event information setting controller 11, a display controller 12, an input controller 13, a data storage 14, a remaining battery capacity monitor 15, and an operation executing section 16. The battery event information setting controller 11, remaining battery capacity monitor 15, and operation executing section 16 are realized by programs stored in the system memory 2 and executed by the CPU 11. The display controller 12 corresponds to the display controller 4 of FIG. 1, the input controller 13 to the keyboard controller 6 of FIG. 1, the data storage to the disk storage unit 3 of FIG. 1, and the sound controller 17 to the sound controller 5 of FIG. 1.

Hereinafter, the operation concerning the battery event management of the computer will be explained.

Figure 3:
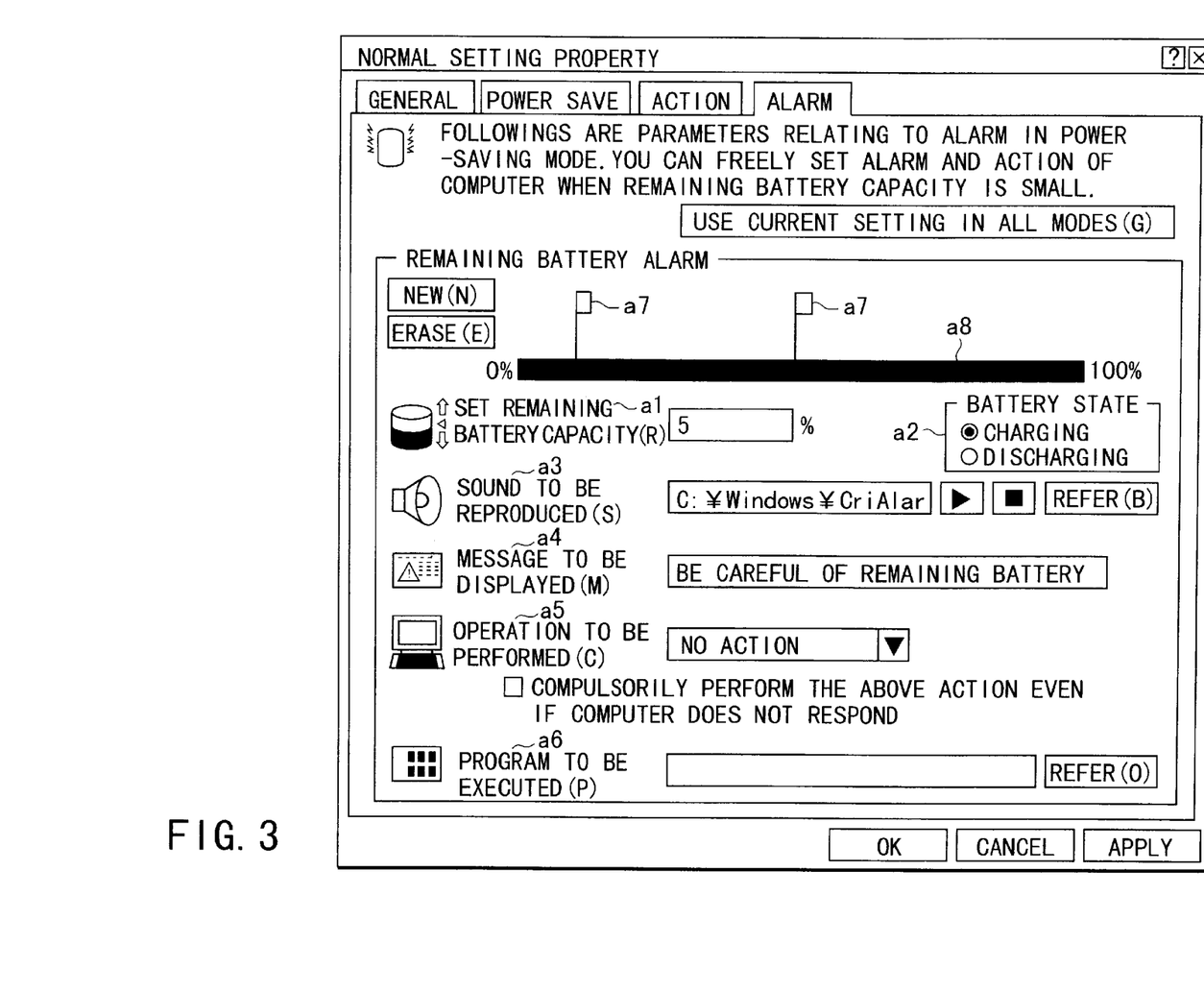
FIG. 3 shows an example of the setting screen on the battery event information setting controller of FIG. 2.
Figure 4:
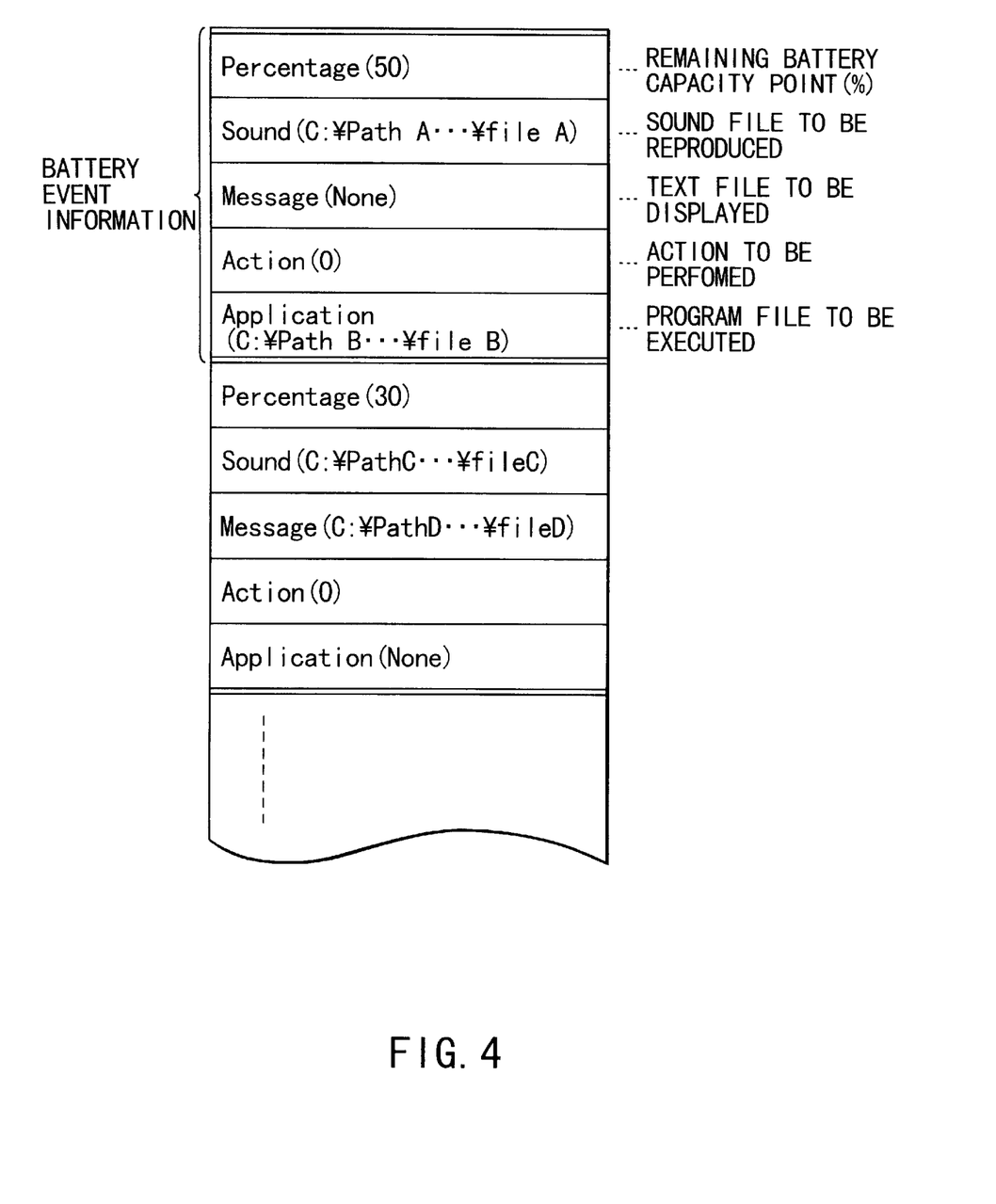
FIG. 4 shows an example of the format of the setting table provided in the data storage section of FIG. 2.

First, the operation of setting battery event information will be explained. When being started up at the request of the user, the battery event information setting controller 11 controls the display controller 12 so as to display a battery event information setting screen as shown in FIG. 3 on the display sections 4a, 4b. The battery event information setting controller 11 receives, via the input controller 13, the contents of the input operation performed by the user to set the battery event information on the setting screen. The battery event information contains sets of remaining battery capacity point data items representing the remaining battery capacity points and event data items representing events generated when the remaining battery capacity coincides with one of the set remaining battery point capacity points. The battery event information setting controller 11 sets the battery event information in a setting table in a format, for example, as shown in FIG. 4, defined on the data storage section 14.

In FIG. 3, the set remaining battery capacity (a1) is a field for specifying the remaining battery capacity point used to trigger the generation of a battery event. The remaining battery capacity point is specified by the ratio (%) of the remaining battery capacity to that of the fully charged battery capacity. The battery state (a2) is a field for specifying whether the specified remaining battery capacity point is for the discharging or charging of the battery. Namely, the condition that a battery event is generated can be specified for the time when the specified remaining battery capacity point has been reached during charging or discharging.

The sound to be reproduced (a3) is a field for specifying sound generated when the specified remaining battery capacity point has been reached in the specified battery state (charging/discharging). In this field, a path indicating the audio file that stores the desired audio data is entered.

The message to be displayed (a4) is a field for specifying a description appearing as a message when the specified remaining battery capacity point has been reached in the specified battery state. In this field, a desired text is entered directly.

The operation (a5) is a field for specifying the operation performed by the computer when the specified remaining battery capacity point has been reached in the specified battery state. One of the choices prepared beforehand, including "NO ACTION," "HYBERNATION (turning off the power of the computer after storing resume data into the hard disk for suspending the operation of the computer)," and "SHUTDOWN (turning off the power of the computer without storing the resume data)," is selected. A check box is provided for an option for compulsorily executing the chosen operation to allow the chosen operation being executed even when the computer does not respond.

The program to be executed (a6) is a field for specifying the program to be started when the specified remaining battery capacity point has been reached in the specified battery state. In this field, a path indicating a program file that has started the desired application program is entered.

The sound to be reproduced (a3), message to be displayed (a4), and program to be executed (a6) are specified independently, and neither exclusively nor selectively. An item for which there is no input is regarded as the item not having been specified.

More than one piece of the battery event information made up of these items can be set for each remaining battery capacity point. A flag (a7) indicating each of the set remaining battery capacity points is displayed above an indicator (a8) representing the present remaining battery capacity.

When setting is done by pressing the [OK] button or [APPLY] button after each item has been specified on the battery event information setting screen, the battery event information setting controller 11 stores these items as the battery event information into the setting table defined on the data storage section 14. Although only one table is shown in FIG. 4, there are two setting tables for charging and discharging. Depending on the specification of the battery state (a2), the battery event information setting controller 11 stores the battery event information in one of these two setting tables.

In the setting table shown in FIG. 4, "Percentage ( )" is a field for holding the set remaining battery capacity point, "Sound ( )" is a field for holding a path representing the sound file to be reproduced, "Message ( )" is a field for holding a path representing the text file to be displayed, "Action ( )" is a field for holding a parameter for indicating the operation of the computer to be executed, and "Application ( )" is a field for holding a path indicating the program file to be started. On the setting screen, a desired text is entered directly as the words in the message. The battery event information setting controller 11 stores this in the created text file and puts the path indicating the internally created text file in "Message ( )" field.

Next, the operation when a battery event is generated will be explained briefly. The remaining battery capacity monitor 15 requests the operating system of the computer to notify the monitor 15 of the change each time the remaining battery capacity has changed. Receiving the notice, the monitor 15 requests the operating system to inform the monitor 15 of the present remaining battery capacity. The remaining battery capacity returned from the operating system in response to the request is the ratio of the present battery capacity to that of the fully charged battery capacity. The remaining battery capacity monitor 15 supplies the returned remaining battery capacity to the operation executing section 16.

Receiving the remaining battery capacity, the operation executing section 16 compares the preceding remaining battery capacity it has held with the present remaining battery capacity just received and determines whether the battery is charging (increasing in remaining battery capacity) or discharging (decreasing in remaining battery capacity) according to the result of the comparison (increase or decrease). If having determined that the battery is charging, the operation executing section will select the charging setting table and check this table for a piece of the battery event information in which the just received remaining battery capacity falls on the remaining battery capacity point. Similarly, if having determined that the battery is discharging, the operation executing section will select the discharging setting table and check this table for a piece of the battery event information in which the just received remaining battery capacity falls on the remaining battery capacity point. If having found the piece of the battery event information in which the just received remaining battery capacity coincides with one of the remaining battery capacity points, the operation executing section will generate the event specified in the battery event information.

Specifically, the operation executing section 16 causes the sound controller 17 to reproduce the audio data stored in the audio file indicated by the path held in the "Sound ( )" field, the display controller 12 to display, in the form of a message, the text data stored in the text file indicated by the path held in the "Message ( )" field, and starts up the application program stored in the program file indicated by the path held in the "Application ( )" field.

Next, a detailed operation procedure for the battery management of the computer will be described by reference to FIGS. 5 and 6.

Figure 5:
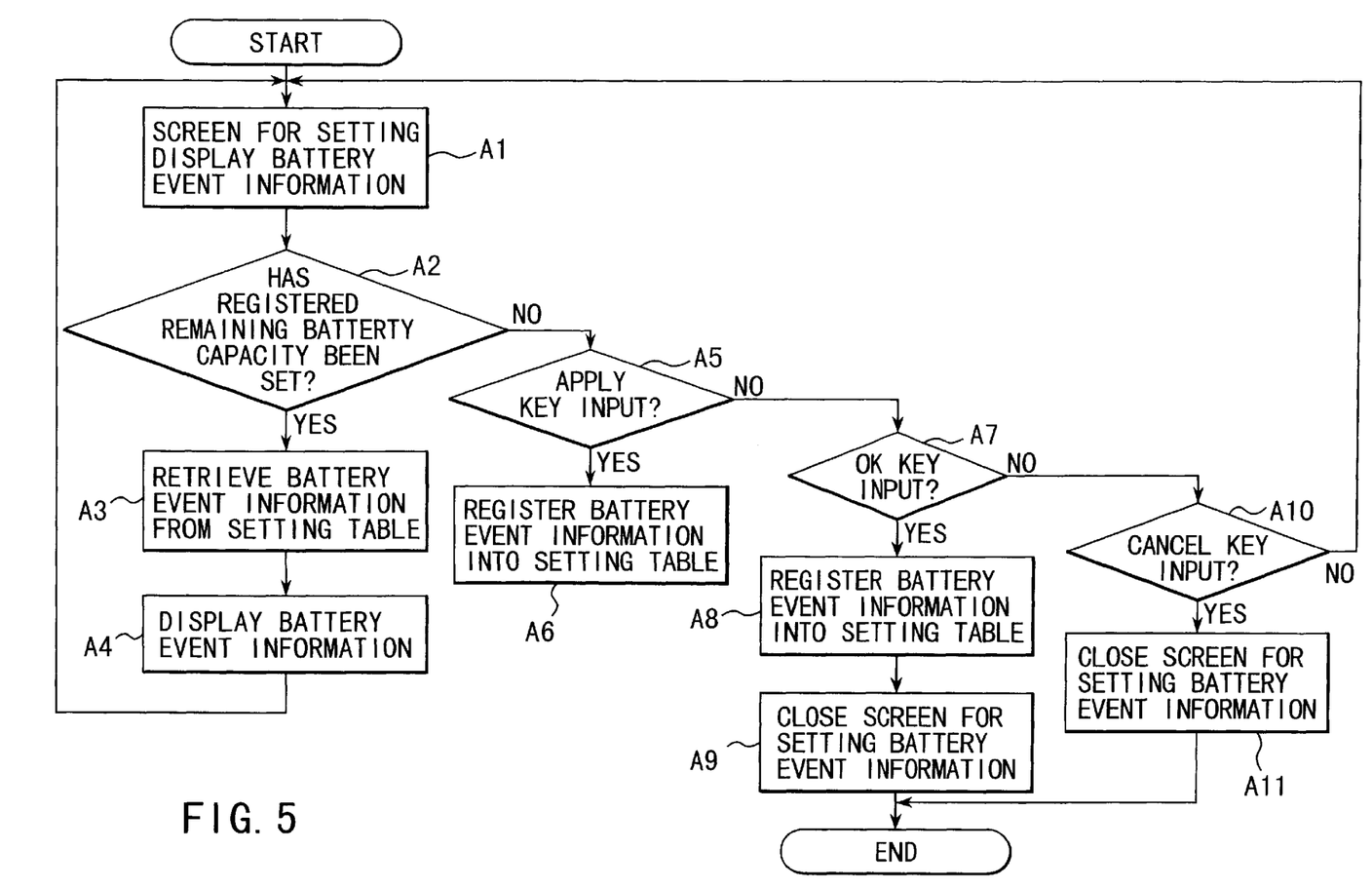
FIG. 5 is a flowchart for describing the procedure for setting the battery event information in the embodiment.

FIG. 5 is a flowchart to help explain the operation of the battery event information setting controller 11 in setting the battery event information.

The display controller 12 displays a battery event information setting screen as shown in FIG. 3 (step A1). The battery event information setting controller 11 receives from the input controller 13 the contents of the input operation the user has performed to set the battery event information on the setting screen. The processes from this point differ, depending on the contents of the operation. First, at step A2, it is determined whether the remaining battery capacity point has been specified which coincides with one of the remaining battery capacity points included in the existing battery event information. The remaining battery capacity point is specified by, for example, pressing the mouse button with the mouse cursor placed in the display position of the flag indicating the desired remaining battery capacity point (a7 in FIG. 3).

If it has been determined that the remaining battery capacity point has been specified which coincides with one of the remaining battery capacity points included in the existing battery event information, the battery event information setting controller 11 will acquire the battery event information (including the specified remaining battery capacity point) from the setting table at step A3 and display the acquired information on the battery event information setting screen at step A4.

On the other hand, if it has been determined that the remaining battery capacity point has been specified which does not coincide with any of the remaining battery capacity points included in the existing battery event information, it will be determined at step A5 whether or not the [APPLY] button has been pressed. If it has been determined that the [APPLY] button has been pressed, the battery event information setting controller 11 will store the battery event information specified on the battery event information setting screen into the setting table on the data storage section 14. Thereafter, the battery event information setting controller 11 will wait for a subsequent input operation without closing the battery event information setting screen.

At step A5, if it has been determined that the [APPLY] button has not been pressed, it will be determined whether or not the [OK] button has been pressed. If it has been determined that the [OK] button has been pressed, the battery event information setting controller 11 will store the battery event information specified on the battery event information setting screen into the setting table on the data storage section 14 at step A8. Thereafter, at step A9, the battery event information setting controller 11 closes the battery event information setting screen and ends the present battery event information setting process.

On the other hand, at step A7, if it has been determined that the [OK] button has not been pressed, it will be determined at step A10 whether or not the [CANCEL] button has been pressed. If it has been determined that the [CANCEL] button has been pressed, the battery event information setting controller 11 will close the battery event information setting screen and end the present battery event information setting process at step A11.

Figure 6:
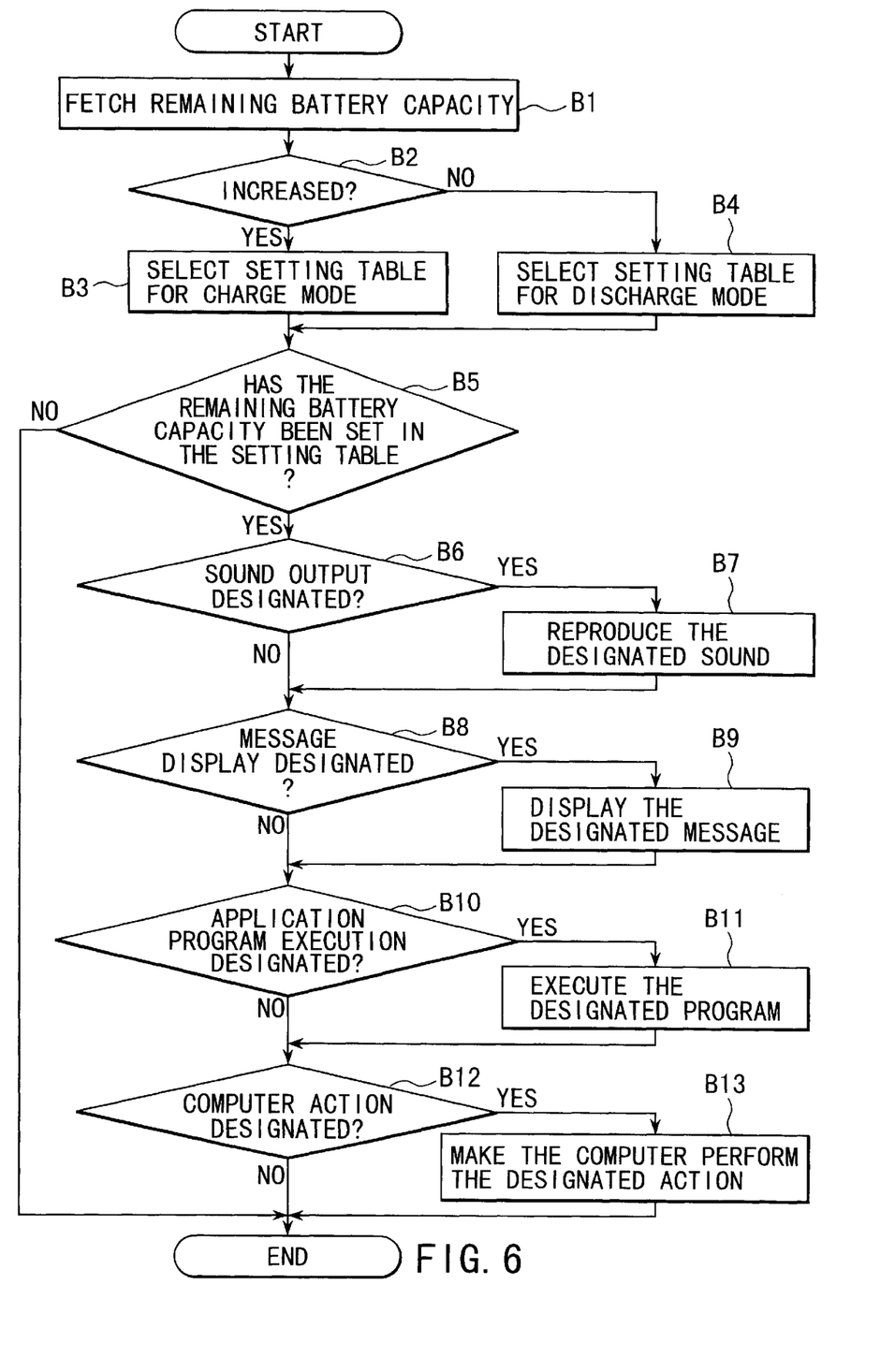
FIG. 6 is a flowchart for describing the operation procedure when a battery event has occurred in the embodiment.

FIG. 6 is a flowchart to help explain the operation of the operation executing section 16 when a battery event is generated.

The operation executing section 16 gets the remaining battery capacity from the remaining battery capacity monitor 15 and stores it in an internal buffer (step B1). The executing section 16 compares the preceding remaining battery capacity stored in the internal buffer with the just stored remaining battery capacity and, on the basis of the result of the comparison, determines whether the battery is charging or discharging.

If having determined that the battery is charging, the operation executing section 16 will select the charging setting table at step B3. If having determined that the battery is discharging, the operation executing section 16 will select the discharging setting table at step B4. Then, the operation executing section 16 will determine at step B5 whether or not the battery event information in which the received remaining battery capacity coincides with one of the remaining battery capacity points exists in the selected setting table.

If having determined that the battery event information in which the received remaining battery capacity coincides with one of the remaining battery capacity points exists, the operation executing section 16 will determine at step B6 whether or not the audio output has been specified. If having determined that the audio output has been specified, the operation executing section 16 will cause the sound controller 17 to reproduce the specified audio file at step B7.

If having determined at step B6 that the audio output has not been specified, the operation executing section 16 will determine at step B8 whether or not the message display has been specified. If having determined that the message display has been specified, the operation executing section 16 will cause the display controller 12 to display the specified text file at step B9.

If having determined at step B8 that the message display has not been specified, the operation executing section 16 will determine whether application startup has been specified. If having determined that application startup has been specified, the operation executing section 16 will start up the specified program file at step B11.

If having determined at step B10 that application startup has not been specified, the operation executing section 16 will determine at step B12 whether or not the operation of the computer has been specified. If having determined that the operation has been specified, the operation executing section 16 will cause the computer to execute the specified operation.

If having determined at step B12 that the operation has not been specified, the operation executing section 16 will end the present battery event process after the process at step B13 has been completed.

As described above, the present embodiment provides a battery-powered computer comprising the battery event setting section capable of setting more than one event information made up of remaining battery capacity point data indicating the remaining battery capacity points and event data representing events to be generated according to the remaining battery capacity points, the remaining battery capacity monitor that monitors the remaining battery capacity, and the operation executing section that generates the event specified by the event data related to the remaining battery capacity point data, when the remaining battery capacity obtained from the remaining battery capacity monitor coincides with the remaining battery capacity point data included in the event information set at the battery event setting section.

With the battery-powered computer, it is possible to cause user-desired events to be generated at remaining battery capacity points the user has specified arbitrarily. This helps meet the user's requirements concerning system operation flexibly. The events include, for example, the reproduction of the audio data stored in the specified audio file, the message output of the text file stored in the specified text file, and the startup of the application program stored in the specified program file.

The battery event setting controller sets the remaining battery capacity point data in either the charging state or discharging state of the battery. The operation executing section determines whether the battery is charging or discharging, depending on whether the remaining battery capacity is increasing or decreasing, and generates the event stored in relation to the remaining battery capacity point when the remaining battery capacity has reached the remaining battery capacity point in the set battery state.

This makes it possible to generate events in such a manner that an event generated when the remaining battery capacity point has been reached as a result of charging differs from an event generated when the remaining battery capacity point has been reached as a result of discharging. This enables the user's requirements concerning system operation to be met more precisely. For instance, when a server computer to which client computers are connected is forced to operate from the battery because of power failure, an application program for notifying the client computers of suspension of request acceptance may be started up automatically when the remaining battery capacity has dropped to a certain remaining battery capacity point due to discharging. On the other hand, when the external power supply is started again and the remaining battery capacity point equal to the preceding remaining battery capacity point has been reached through charging, or when the remaining battery capacity to notify the suspension of request acceptance has been secured even during the cutoff of the external power supply, an application program for notifying the client computers of the start of request acceptance may be started automatically.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, the types of events generated, the layout of the event information setting screen, and the details of the procedure for setting the event information may be modified suitably.

According to the present invention, there are provided a computer which enables the system to execute various processes, including the process of outputting the desired sound at a given remaining battery capacity point, the process of displaying the desired message, and the process of staring the desired application program, and a battery event managing method in the computer.

What is claimed is:

1. An event managing method in a computer, comprising the steps of:

setting a remaining battery capacity point parameter which is an arbitrary ratio of a set remaining battery capacity to a predetermined charged battery capacity and an event parameter which relates to the remaining battery capacity point parameter, the event parameter including a parameter which is executed even when a program of the computer does not respond, and the event parameter representing an event for causing the computer to carry out a specified operation; and performing an event represented by the set event parameter when a ratio of a remaining battery capacity to the predetermined charged battery capacity has reached the set remaining battery capacity point parameter.

2. The event managing method according to claim 1, wherein said setting step sets more than one remaining battery capacity point parameters and more than one event parameter.

3. The event managing method according to claim 1, wherein said setting step sets two remaining battery capacity point parameters related to the set remaining battery capacity in either the discharging or charging of the battery and sets two event parameters which are related to the two remaining battery capacity point parameters, and said performing step determines whether the battery is charging or discharging, depending on whether the remaining battery capacity is increasing or decreasing and performs an event when the ratio of the remaining battery capacity to the predetermined charged battery capacity has reached the remaining battery capacity point parameter related to either discharging or charging of the battery in said setting step.

4. The event managing method according to claim 3, wherein said performing step requests an operating system to provide notification of a change of the remaining battery capacity when the remaining battery capacity has changed, when being informed of the change, requests the operating system to provide notification of a present remaining battery capacity, sets the remaining battery capacity when notification of the change is provided by the operating system, compares the present remaining battery capacity with a previously stored remaining battery capacity, and determines whether the battery is discharging or charging.

5. The event managing method according to claim 1, further comprising the step of, when having already set the remaining battery capacity point, displaying event information corresponding to the remaining battery capacity point parameter.

6. A computer comprising:

an event setting unit configured to set a set of parameters relating to an alarm in a power saving mode, the parameters including a remaining battery capacity point parameter which is an arbitrary ratio of a set remaining battery capacity to a predetermined charged battery capacity and an event parameter which relates to the remaining battery capacity point parameter, the event parameter including a parameter indicating an event which is compulsorily executed even when a program of the computer does not respond, the event parameter representing an event for causing the computer to carry out a specified operation; and an event performing unit configured to perform an event represented by the set event parameter when a ratio of a remaining battery capacity to a fully charged battery capacity has reached the set remaining battery capacity point parameter.

7. The computer according to claim 6, wherein said event setting unit sets more than one set of parameters.

8. The computer according to claim 6, wherein said event setting unit sets two remaining battery capacity point parameters related to the set remaining battery capacity in either discharging or charging of the battery and two event parameters which are related to the two remaining battery capacity point parameters, and said event performing unit determines whether the battery is charging or discharging, depending on whether the remaining battery capacity is increasing or decreasing and performs an event represented by the set event parameter related to either discharging or charging of the battery, when the ratio of the remaining battery capacity to the predetermined charged battery capacity has reached the set remaining battery capacity point parameter in discharging or charging of the battery.

9. The computer according to claim 6, wherein the event parameter further represents an a second event for reproducing a specified audio file.

10. The computer according to claim 6, wherein the event parameter further represents a second event for displaying a specified text file.

11. The computer according to claim 6, wherein the event parameter further represents a second event for executing a specified application program.

12. The computer according to claim 6, wherein the event parameter represents an event for causing the computer to carry out a specified operation.

13. The computer according to claim 6, wherein said event performing unit includes a remaining battery capacity monitor which requests an operating system to provide notification of a change of the remaining battery capacity when the remaining battery capacity has changed, and, when being informed of the change, requests the operating system to provide notification of a present remaining battery capacity.

14. The computer according to claim 13, wherein said remaining battery capacity monitor includes a setting unit configured to set the remaining battery capacity when notification of the change is provided by the operating system and a comparator configured to compare the present remaining battery capacity with a previously stored remaining battery capacity and determine whether the battery is discharging or charging.

15. The computer according to claim 6, wherein said event setting unit, when having already set the remaining battery capacity point parameter, displays event information corresponding to the remaining battery capacity point parameter.

* * * * *

UNITED STATES PATENT AND TRADEMARK OFFICE
CERTIFICATE OF CORRECTION

PATENT NO.    : 6,643,786 B1
DATED         : November 4, 2003
INVENTOR(S)   : Kawakami It is certified that error appears in the above-identified patent and that said Letters Patent is hereby corrected as shown below:

<u>Column 10,</u>
Line 23, change "represents an a second" to -- represents a second --.

Signed and Sealed this

Sixth Day of January, 2004

JAMES E. ROGAN
*Director of the United States Patent and Trademark Office*